3,376,468
METHOD AND APPARATUS FOR HEATING GASES TO HIGH TEMPERATURES
Thomas J. Hirt and Chester W. Marynowski, Mountain View, Calif. (both % Northern Natural Gas, Stanford Research Institute, Menlo Park, Calif. 94025)
Filed Oct. 11, 1965, Ser. No. 494,554
7 Claims. (Cl. 315—111)

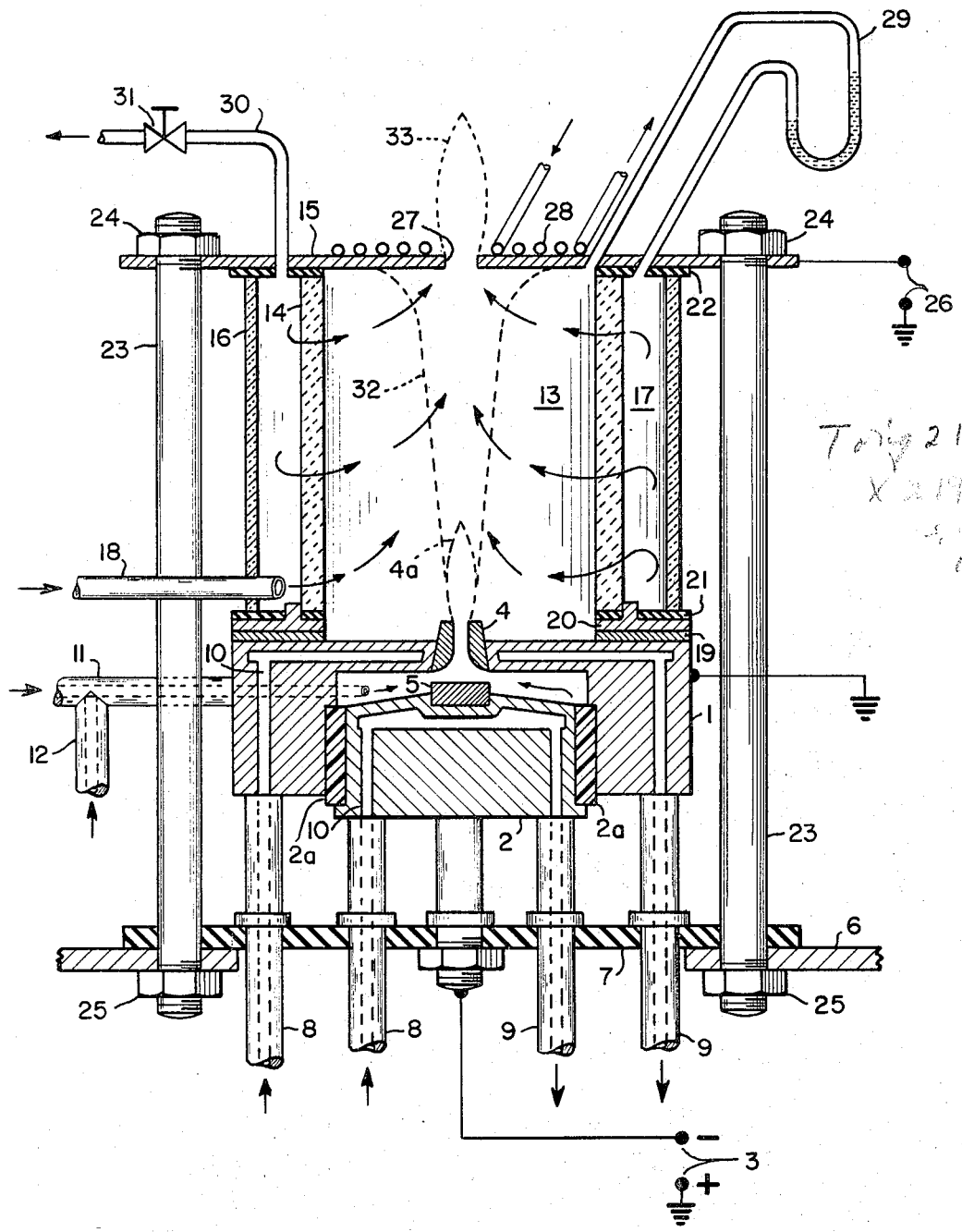
April 2, 1968     T. J. HIRT ET AL     3,376,468
METHOD AND APPARATUS FOR HEATING GASES TO HIGH TEMPERATURES
Filed Oct. 11, 1965
INVENTORS.
Thomas J. Hirt
Chester W. Marynowski
BY
THEIR ATTORNEYS United States Patent Office 3,376,468
Patented Apr. 2, 1968

In U.S. Patent No. 3,004,137, there is described and claimed an electrically augumented flame in which an electrical discharge is distributed throughout a flame created by chemical combustion and thereby heat derived from the electrical energy is added to the heat produced by the chemical combustion. The electrical discharge employs a high voltage and a low current as contrasted to an electric arc which employs a low voltage and a high current and which is concentrated into a narrow filament between two electrodes.

Such an electrically augumented flame produces useful results. For example, electrical power supply problems are reduced because large amounts of power can be supplied at conveniently high voltages. Since relatively low currents are employed, construction and maintenance of electrodes are greatly simplified and energy losses due to electrode consumption are avoided. Substantially uniform temperature is maintained throughout the entire flame and temperatures can be obtained with ordinary fuels which otherwise can be obtained only with high cost fuels such as acetylene, cyanogen, etc.

The term "distributed discharge" denotes a type of high power electrical discharge which employs a high voltage and low current, as contrasted to the electric arc which employs a low voltage and high current and tends to contract into a narrow super heated and thus highly electrically conductive channel between two electrodes.

In Karlovitz application for U.S. patent, Ser. No. 406,810, assigned to the assignee of this application, there are described improvements in method and apparatus disclosed in said Patent No. 3,004,137 in which the flame is preionized prior to the application of electrical discharge whereby the electrical conductivity of the flame can be increased and more precisely controlled. In effect the flame is divided into two zones. The first zone is maintained at a high temperature (in the order of 3000° K.) and ionizing additives are introduced into this hot zone. Hot gases containing additives ionized at the high temperature flow from the first zone into the second zone in a highly turbulent state. Because of the turbulence and the high conductivity of the gases a distributed electrical discharge may be maintained through the gases in the second zone. Only a small portion of the volume of gas to be heated is supplied to the first zone, the major portion being supplied directly into the second zone.

Said Karlovitz application, Ser. No. 406,810 also describes a method and apparatus for heating gases to the high temperatures in which the heat supplied to the first zone is not created by chemical combustion but by an electrical arc. This makes it possible to heat gas streams which have such chemical compositions that in order to obtain the desired end product, they can not be mixed with products of combustion.

We have invented particular forms of methods and apparatus for heating gases to high temperatures by the application of a uniformly distributed electrical discharge to the gases as disclosed in said Karlovitz application. Specifically, we employ a plasma torch to heat the gases to a desired temperature in a preionizing zone to which ionizing additives are added and project the heated gases containing ionized additives in the form of a jet into a turbulence chamber. A high voltage is maintained across the chamber and a uniformly distributed electrical discharge is maintained through the gases because of the high degree of turbulence of the gases in the chamber and the high electrical conductivity of the gases. Only a relatively small portion of the gases to be heated is introduced into the electric arc. The major portion of the gases to be heated is introduced into the turbulence chamber by a novel arrangement which we have invented which reduces thermal shock and heat losses at the walls of the chamber.

In the accompanying drawing, we have illustrated a presently preferred embodiment of our invention, the drawing being a central vertical section through the apparatus.

Referring to the drawing, the apparatus comprises a plasma torch having a positive electrode 1 which is grounded and a negative electrode 2 which is connected to the negative side of a direct current supply 3, the positive side of which is grounded. A cylinder 2a of insulating material, for example polytetrafluoroethylene, is placed between the two electrodes.

The positive electrode 1 has an outlet nozzle 4 which is tapered so that gases emerge from the nozzle in the form of a high velocity jet 4a. The negative electrode has an insert 5 of tungsten and in operation, an electric arc is maintained between the nozzle 4 and the insert 5.

A platform 6 supports a flange 7 of insulating material, with flange supports tubes 8 and 9 which in turn support electrodes 1 and 2. The tubes 8 supply cooling water to water passages 10 in the electrodes and the water flows out of the passageways through the tubes 9.

A tube 11 supplies a stream of gas for operation of the plasma torch. This tube has a branch 12 through which some additional gas is also supplied to act as a carrier for ionizing additives which pass with the gas into the arc. The arc heats the gases to a high temperature, substantially completely vaporizes the additives and also ionizes them to a high degree of ionization. Apparatus for feeding an additive, such as powdered potassium chloride, into the branch 12 is described in our copending application Ser. No. 429,756.

As explained in our copending application, Ser. No. 429,756 which is directed to a three-zone method and apparatus for creating an electrically augumented flame, it is preferable that the ionizing additives be completely ionized but, in any event, the degree of ionization of the additives should be above 50%. As is also explained in said application, the gases should be heated to a temperautre at which the temperature coefficient of electrical conductivity of the gases is such that the electrical conductivity of the gases will not rise by more than a factor of 2 upon an increase in temperature of 1000° K.

The ionizing additive should be a material having a low ionization potential and we have found that potassium chloride in the form of a fine powder having a surface means particle diameter of approximately 8 microns is very suitable.

The highly heated and highly conductive gases produced by the plasma torch flow through the nozzle 4 in the form of a high velocity jet into a turbulence chamber 13. As shown in the drawing, the electrode 1 forms an end wall of the chamber which also has a cylindrical wall 14 and an end wall 15 which is opposite to the electrode 1 and which also acts as a third electrode as will be later described.

A cylindrical wall 16 surrounds the wall 14 and forms with it an annular chamber 17, the wall 14 being common to both chambers. Preferably, the cylinder 16 is made of a transparent heat resistant glass such as that sold under the trademark "Pyrex."

The gas supplied to the plasma torch may be a small portion of the gas to be heated or a separate gas. The main body of gas to be heated is fed to the annular chamber 17 under pressure through the tube 18. The cylindrical wall 14 is made of heat resistant porous material such as porous alumina and pressure on the gas fed into the annular chamber 17 causes the gas to transpire into the turbulence chamber 13.

A lead gasket 19 is seated on the outer portion of the electrode 1 and carries a brass alignment ring 20 on which is seated an asbestos gasket 21. The asbestos gasket supports the two cylinders 14 and 16. The cylinders 14 and 16 support a second asbestos gasket 22 on which the end wall 15 rests. The entire assembly is held together by tie rods 23 of insulating material which are threaded at each end and have nuts 24 at one end against the end wall 15 and nuts 25 at the other end against the platform 6.

The end wall 15 acts as a third electrode and therefore it is made of metal and is connected to the high voltage side of a supply 26 of high voltage alternating current. The other side of the current supply 26 is grounded so that a high voltage is maintained between the electrode 1 and the end wall or third electrode 15. The end wall also has an orifice 27 for the discharge of heated gases from the chamber 13.

Water cooled copper coils 28 are secured to the top of the electrode 15. A manometer 29 is connected to measure the difference in pressure between the annular chamber 17 and the chamber 13. A bleed tube 30 controlled by a valve 31 is used to reduce the supply of gas in the annular chamber 17 when the apparatus is started as will be described.

To start the process, the following steps are followed.

(1) Cooling water is supplied to the electrodes of the plasma torch and the third electrode at the downstream end of the chamber 13.

(2) Gas is supplied to the plasma torch.

(3) Gas is fed into the chamber 13 from the chamber 17 at a low rate to minimize subsequent thermal shock to the wall of the chamber 13.

(4) An arc is established between the nozzle 4 and the insert 5.

(5) The supply of ionizing additive to the branch 12 is started.

(6) The flow of gas to the chamber 13 from chamber 17 is slowly reduced and then cut off by adjustment of the valve 31 in the bleed tube 30 to allow the chamber 13 to heat.

(7) A relatively low A.C. voltage is applied to third electrode 15 creating a diffused electrical discharge 32 between electrode 15 and grounded electrode 1.

(8) The supply of working gas to the chamber 13 turned on.

(9) The voltage between the electrode 1 and the third electrode 15 is increased to any desired value within diffused discharge operating ranges.

The jet, upon entering the chamber 13, entrains and is cooled by the gas to be heated which is supplied through the wall 14. Therefore, the main flow of gas through the wall 14 is reduced during start-up so that the chamber can be filled by hot recirculating gases from the plasma torch. Thereby a diffused electrical discharge 32 can be established along the length of the chamber 13 and the supply to the chamber 13 of gas to be heated can then be restored.

The electrically conducting central core established by the diffused discharge is cooled by the addition of the gases to be heated, but this cooling is counterbalanced by the heating of the core by the diffused discharge. This thermal balance in conjunction with the turbulent mixing produced by the high velocity jet from the plasma torch opposes the formation of superheated zones or channels within the chamber 13 and therefore, there is maintained within the chamber 13 a diffused electrical discharge through the chamber 13. The heated gases flow as a flame 33 from the chamber 13 through the orifice 27 in the third electrode 15.

We have made and tested apparatus such as is shown in the drawing. The principal dimensions of the apparatus were:

| | Inches |
|---|---|
| Length of chamber 13 | 8 |
| Interior diameter of the wall 14 | 6 |
| Outside diameter of the wall 14 | 7 |
| Interior diameter of the nozzle 4 | ¼ |
| Diameter of the orifice 27 | 1 |
| Thickness of the electrode 15 | ¼ |

Typical operating conditions for the experimental unit were:

| | |
|---|---|
| Gas flow rate to the plasma torch __s.c.f.m__ | 7.2 |
| Flow rate of gas to be heated to the chamber 13 __s.c.f.m__ | 12.0 |
| Electrical power to the plasma torch __kw__ | 14.0 |
| Estimate efficiency of the plasma torch __percent__ | 50 |
| Estimated power supplied by the plasma torch to the gas __kw__ | 7.0 |
| Power supplied to the electrodes 1 and 15 __kw__ | 5.0 to 6.0 |
| Voltage between the electrodes 1 and 15 __kv__ | 2.1 to 2.4 |
| Feed rate of ionizing additive __g./min__ | 0.1 |

While we have described a presently preferred embodiment of our invention, it is to be understood that it may be otherwise embodied within the scope of the appended claims.

We claim:

1. A method of heating gases to high temperatures which comprises,
    (A) Maintaining a gas stream,
    (B) Creating in said stream a first zone of high temperature,
    (C) Injecting ionizing additives into said first zone and ionizing said additives in said zone,
    (D) Flowing heated gas containing ionized additives in the form of a jet into a second zone and creating a high degree of turbulence in said gas in said second zone,
    (E) Maintaining a central core of gases extending through the second zone and heated by a uniformly distributed electrical discharge through the core, and
    (F) Introducing gases to be heated into said second zone at the boundaries of said central core and entraining the gases in the core.

2. A method for heating gases as described in claim 1 in which the degree of ionization of said ionizing additives in the second zone is above 50%.

3. A method for heating gases as described in claim 1 in which the gas is heated in the first zone to a temperature at which the temperature coefficient of electrical conductivity of the gas is such that the electrical conductivity of the gas will not rise by more than a factor of 2 upon further increase in temperature of 1000° K.

4. A method for heating gases as described in claim 1 in which said ionizing additives are substantially completely vaporized in said first zone.

5. Apparatus for heating gases to high temperatures comprising,
    (A) Means for creating an electric arc,
    (B) Means for supplying a gas stream to said arc to be heated thereby to form a preionizing zone of high temperature,
    (C) Means for introducing ionizing additives to said gas stream in advance of said arc to be ionized by heat from said arc,
    (D) An orifice for the flow of heated gas containing ionized additives from said zone of high temperature in the form of a jet, (E) A chamber downstream of said orifice into which said jet is discharged to create a high degree of turbulence in the chamber,
(F) Means spaced from the jet for introducing a gas to be heated into portions of said chamber,
(G) Means for maintaining a uniformity distributed electrical discharge through the gases within said chamber, and
(H) Means for discharging heated gases from said chamber.

6. Apparatus for heating gases as described in claim 5 in which the means for introducing gas to be heated into said chamber comprises,
(A) A wall of porous heat resistant material forming at least a portion of said chamber,
(B) A second chamber having said wall in common with the chamber in which the gases are heated, and
(C) Means for introducing the gases to be heated into said second chamber and causing them to flow through the porous wall into the first chamber.

7. Apparatus for heating gases to high temperatures comprising,
(A) A plasma torch having,
  (1) Two electrodes,
  (2) Means for supplying an electric current to the electrodes to create an arc between them,
  (3) Means for supplying a gas stream to said arc to be heated thereby,
  (4) A jet orifice in one electrode for the discharge of heated gases from said torch,
(B) Means for supplying ionizing additives to said gas stream in advance of the arc,
(C) A first chamber positioned downstream of said orifice,
  (1) The electrode having said orifice forming one wall of the chamber,
  (2) A third electrode spaced from said electrode having the orifice and forming a wall of the chamber opposite to the wall formed by the electrode having the orifice, and
  (3) A wall formed of heat resistant porous material joining the walls formed by the electrodes and completing the chamber,
(D) A second chamber surrounding said wall of heat resistant porous material and having said wall in common with the first chamber,
(E) Means for supplying gases to be heated to said second chamber under pressure to cause it to transpire through said heat resistant porous wall into the first chamber,
(F) Means for supplying an electric current to said electrode having the jet orifice and said third electrode to maintain a uniformly distributed discharge through the gases in said first chamber, and
(G) An exit orifice in said first chamber for the discharge of heated gases from said chamber.

References Cited

UNITED STATES PATENTS 3,201,635   8/1965   Carter _____ 313—231

JAMES W. LAWRENCE, *Primary Examiner.*

R. JUDD, *Assistant Examiner.*